(12) United States Patent
Fecteau et al.

(10) Patent No.: US 12,734,973 B2
(45) Date of Patent: Sep. 15, 2026

(54) CROSS-VEHICLE BEAM FORMING A GLOVE BOX THAT PROVIDES STORAGE AND ACCOMMODATES LOAD PATHS

(71) Applicant: Atieva, Inc., Newark, CA (US)

(72) Inventors: Adam Johnson Fecteau, San Jose, CA (US); Lucas Jungmann, Newark, CA (US)

(73) Assignee: Atieva, Inc., Newark, CA (US)

( * ) Notice: Subject to any disclaimer, the term of this patent is extended or adjusted under 35 U.S.C. 154(b) by 357 days.

(21) Appl. No.: 18/510,205

(22) Filed: Nov. 15, 2023

(65) Prior Publication Data

US 2025/0153649 A1 May 15, 2025

(51) Int. Cl.
*B60R 7/06* (2006.01)
*B60R 21/206* (2011.01)

(52) U.S. Cl.
CPC .............. *B60R 7/06* (2013.01); *B60R 21/206* (2013.01)

(58) Field of Classification Search
CPC ................................ B60R 7/06; B60R 21/206
See application file for complete search history.

(56) References Cited

U.S. PATENT DOCUMENTS 6,536,802 B1 3/2003 Sutherland et al.
7,261,318 B2 8/2007 Enders
2012/0018987 A1* 1/2012 Matsushima ......... B60R 21/206 280/730.2
2016/0288757 A1* 10/2016 Ando .................. B60R 21/2338

FOREIGN PATENT DOCUMENTS

JP 2004203226 A * 7/2004
JP 2009248737 A * 10/2009

OTHER PUBLICATIONS

JP 2009248737 A Machine English Translation (Year: 2009).*
JP2004203226A Machine English Translation (Year: 2004).*
International Search Report and Written Opinion for PCT Application No. PCT/US2024/055921, mailed on Feb. 10, 2025, 14 pages.

* cited by examiner

*Primary Examiner* — Jason D Shanske
*Assistant Examiner* — Matthew James O'Neill
(74) *Attorney, Agent, or Firm* — Brake Hughes Bellermann LLP

(57) ABSTRACT

A vehicle comprises: a vehicle body including a passenger compartment; a cross-vehicle beam extending in a transverse direction inside the passenger compartment, the cross-vehicle beam including a metal profile and plastic material, wherein the plastic material forms a glove box, the glove box having an opening and first and second side walls that are substantially perpendicular to a longitudinal axis of the metal profile; and a first airbag device extending along the opening and mounted to the glove box using a first bracket portion at a first end of the first airbag device and using a second bracket portion at a second end of the airbag device opposite from the first end, wherein a first reaction force load path from deployment of the first airbag device extends through the first side wall into the metal profile.

16 Claims, 5 Drawing Sheets

CROSS-VEHICLE BEAM FORMING A GLOVE BOX THAT PROVIDES STORAGE AND ACCOMMODATES LOAD PATHS

TECHNICAL FIELD

This document relates to a cross-vehicle beam forming a glove box that provides storage and accommodates load paths.

BACKGROUND

Instrument panels for vehicles are made up of several components. A cross-vehicle beam is a structural component of the instrument panel, and is also responsible for modal, crash and quality performance. The cross-vehicle beam may be required to handle load paths of forces from occupants in the event of a crash, as well as from airbag deployment. In prior approaches, multiple unique parts have been used to achieve some storage loads and some airbag/occupant crash loads.

SUMMARY

In an aspect, a vehicle comprises: a vehicle body including a passenger compartment; a cross-vehicle beam extending in a transverse direction inside the passenger compartment, the cross-vehicle beam including a metal profile and plastic material, wherein the plastic material forms a glove box, the glove box having an opening and first and second side walls that are substantially perpendicular to a longitudinal axis of the metal profile; and a first airbag device extending along the opening and mounted to the glove box using a first bracket portion at a first end of the first airbag device and using a second bracket portion at a second end of the airbag device opposite from the first end, wherein a first reaction force load path from deployment of the first airbag device extends through the first side wall into the metal profile.

Implementations can include any or all of the following features. The first bracket portion is aligned with the first side wall, and wherein the second bracket portion is positioned along the opening between the first and second side walls. The first bracket portion is positioned inboard of the second bracket portion in the vehicle. The plastic material further comprises a load structure, and wherein a first reaction force load path from deployment of the first airbag device extends through the load structure. A first end of the load structure is connected to the second bracket portion, and wherein a second end of the load structure is connected to the vehicle body. The load structure extends from the first end along the opening to the second side wall, and from the second side wall to the second end outside the second side wall from the glove box. The metal profile has an open profile along an entirety of the longitudinal axis, and wherein the plastic material is overmolded onto the metal profile. The open profile is a C-profile. The glove box defines a transverse wall that is substantially perpendicular to, and connects to each other, the first and second side walls, and wherein the glove box is positioned adjacent the metal profile with the transverse wall substantially aligned with the longitudinal axis. The plastic material further comprises a rib defining a plane that is substantially perpendicular to the longitudinal axis, the rib connecting the metal profile and the transverse wall to each other. The metal profile has a C-profile along an entirety of the longitudinal axis, and wherein the rib extends into the C-profile. The rib is configured so that an occupant crash load path extends substantially in the plane of the rib. The first airbag device is a knee airbag device. The vehicle further comprises a second airbag device mounted to the plastic material on an opposite side of the metal profile from the glove box and the first airbag device. The glove box defines a back wall opposite the opening, and wherein the glove box further comprises a mounting point for an instrument panel part, the mounting point positioned on an exterior surface of the back wall. The glove box further comprises a locating hole.

BRIEF DESCRIPTION OF DRAWINGS

Like reference symbols in the various drawings indicate like elements.

DETAILED DESCRIPTION

Figures 1, 2:
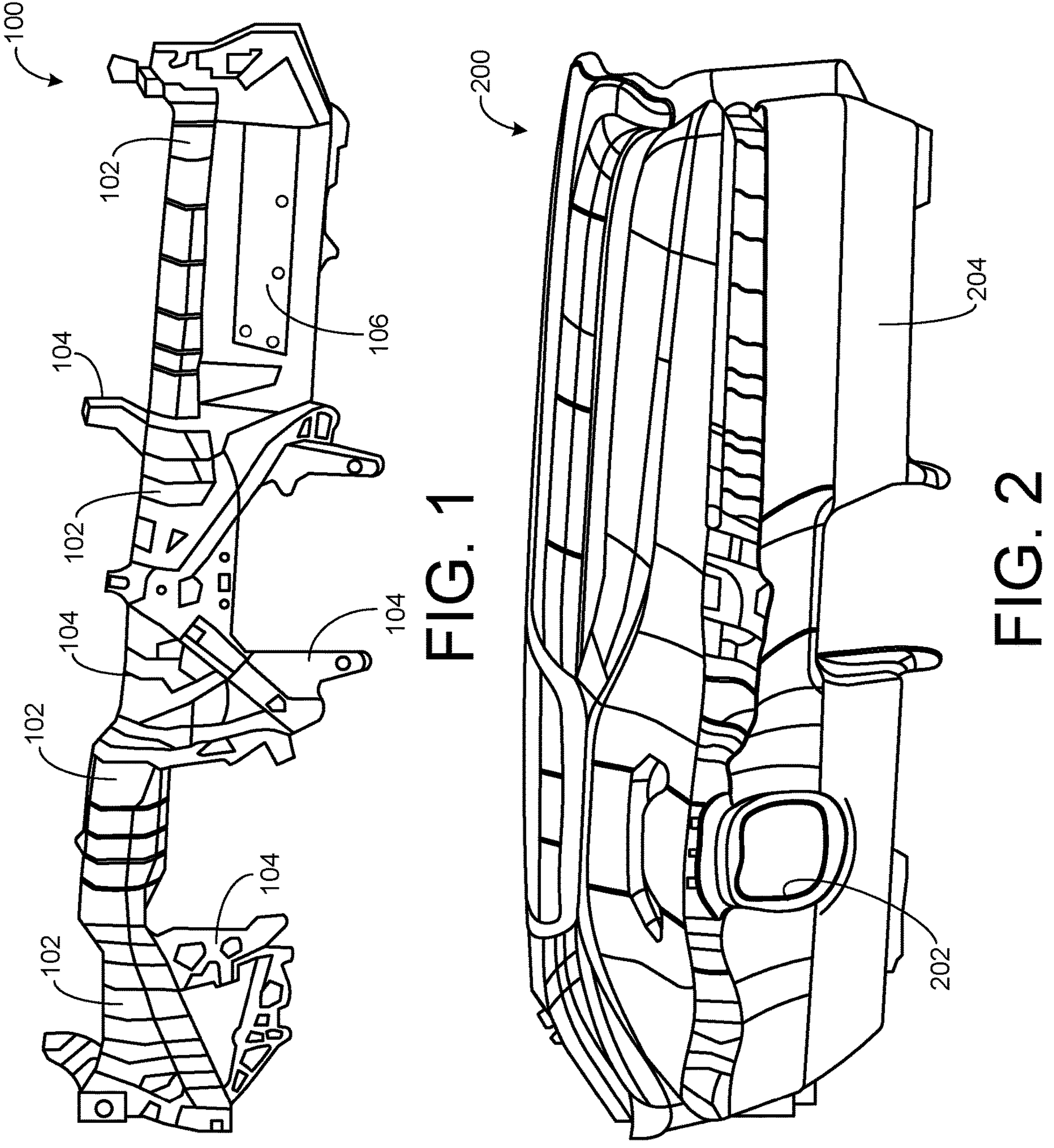
FIG. 1 shows an example of a cross-vehicle beam.
FIG. 2 shows an example of an instrument panel that can be supported by the cross-vehicle beam of FIG. 1.

This document describes examples of systems and techniques relating to a cross-vehicle beam forming a glove box that provides storage and accommodates load paths. In some implementations, multiple functions can be combined into a cross-vehicle beam design. Such functions can include, but are not limited to, providing a weight-bearing location such as a glove box that also satisfies functional load requirements of airbag deployment (e.g., a knee airbag). A design combining such functions can reduce the part count in the vehicle. For example, the storage area provided by the glove box can be integrated into the cross-vehicle beam. Reducing the number of parts eliminates the fasteners that would otherwise have been used, which further helps the load-bearing capacity. The present subject matter can provide a cost saving (e.g., fewer parts are manufactured and fewer injection tools are manufactured), a mass reduction, and improved speed of assembly (e.g., because fewer parts and fasteners are used). A cross-vehicle beam can be designed to be sufficient for airbag loads, occupant crash loads, and glove box storage requirements. In the glove box, a side wall (e.g., a vertical wall) can be designed to align with one or more reaction force load paths of an airbag, while still providing proper stiffness in the occupant's load path during a crash. In some implementations, the shape and design of a glove box can provide attachment points for a component such as a harness, can provide support for loading of an additional airbag (e.g., a passenger airbag), and/or can provide locating holes for a mat or other glove box part.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons.

Examples herein refer to a cross-vehicle beam. As used herein, a cross-vehicle beam is a structural component installed in any type of vehicle so as to span substantially from one side of the vehicle to an opposite side of the vehicle. For example, a cross-car beam can extend between the left and right A-pillars of the vehicle.

Examples herein refer to a glove box. As used herein, a glove box includes any compartment of a vehicle's instrument panel that is designed for storage. The glove box defines one or more interior compartments. The glove box may or may not have one or more doors for closing the interior compartment(s), and such door(s), if any, may or may not be lockable. The glove box may or may not have interior lighting. The glove box may or may not provide one or more outlets (e.g., for communication and/or low-voltage power supply). A glove box can be formed by injection molding and can be part of the plastic material of a cross-vehicle beam. If such a glove box has a door, the door can be a component of the instrument panel supported by the cross-vehicle beam.

Examples herein refer to an airbag device. As used herein, an airbag device includes at least one airbag cushion and an inflator. The airbag cushion is an inflatable pouch that is coupled to an outlet of the inflator. The inflator is a device configured to rapidly inflate the airbag cushion with a gas upon being triggered by controlling circuitry. Examples of airbag devices include but are not limited to a knee airbag (e.g., an airbag designed to reduce leg injuries) and a passenger airbag (e.g., an airbag designed to reduce head or torso injuries).

Examples herein refer to a load path. As used herein, a load path is a path that force can be reacted through a material. A load path can relate to force from airbag deployment, and/or to force from a vehicle occupant in the event of a crash, to name just two examples.

Examples herein refer to a front, rear, top, or a bottom. These and similar expressions identify things or aspects in a relative way based on an express or arbitrary notion of perspective. That is, these terms are illustrative only, used for purposes of explanation, and do not necessarily indicate the only possible position, direction, and so on.

FIG. 1 shows an example of a cross-vehicle beam 100. The cross-vehicle beam 100 can be used with one or more other examples described elsewhere herein. The cross-vehicle beam 100 can be a structural member extending transversely in a vehicle body. The cross-vehicle beam 100 can be designed to support, and be positioned inside or underneath, an instrument panel in a vehicle. Multiple vehicle components in the passenger compartment, including but not limited to a steering column and a display device, may be directly or indirectly attached to the cross-vehicle beam 100. In some implementations, each end of the cross-vehicle beam 100 can be configured for attachment to a respective A-pillar in the vehicle. The cross-vehicle beam 100 can be made of any suitable material. Here, the cross-vehicle beam 100 includes a metal profile 102 and plastic material 104. The metal profile 102 defines a longitudinal axis along its length between its two ends. The plastic material 104 can be overmolded onto the metal profile 102. A glove box 106 is formed by the plastic material 104. The shape of the plastic material 104 can be configured so that the cross-vehicle beam 100 balances the requirement of storage loads inside the glove box 106 with the required structure to resist plastic breakage from airbag deployment or crash loads. The design of the cross-vehicle beam 100 can allow airbag reaction loads to pass through the plastic material 104 and into stiffer areas, such as the metal profile 102 on an inboard side and the vehicle body (e.g., the body-in-white) on an outboard side.

FIG. 2 shows an example of an instrument panel 200 that can be supported by the cross-vehicle beam 100 of FIG. 1. The instrument panel 200 can be used with one or more other examples described elsewhere herein. The instrument panel 200 is here configured for a left-hand drive vehicle, and an opening 202 will accommodate a steering column aligned with the driver's seat. The instrument panel 200 includes a glove box door 204. In some implementations, the glove box door 204 can be a mounted by a hinge to cover a glove box that is formed by the plastic material of the cross-vehicle beam 100, for example as described below.

Figure 3:
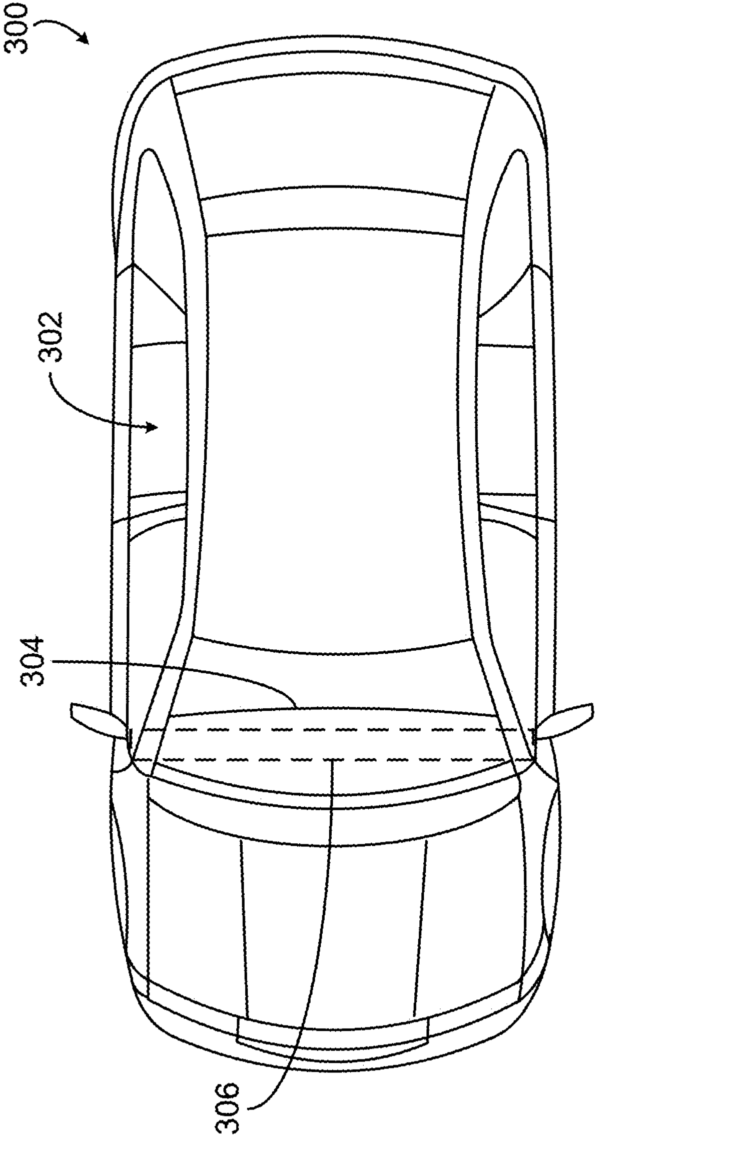
FIG. 3 shows an example of a vehicle that can include the instrument panel of FIG. 2 and/or the cross-vehicle beam of FIG. 1.

FIG. 3 shows an example of a vehicle 300 that can include the instrument panel 200 of FIG. 2 and/or the cross-vehicle beam 100 of FIG. 1. The vehicle 300 can be used with one or more other examples described elsewhere herein. The vehicle 300 is shown from above and has a vehicle body with a passenger compartment 302 that is here partially visible through the windows. The vehicle 300 can have an instrument panel 304 positioned at a front of the passenger compartment 302. For example, the instrument panel 304 can be the instrument panel 200 of FIG. 2. In some implementations, the instrument panel 3204 extends substantially from one side to the other of the vehicle 300 in a transverse direction. A structure 306 is schematically illustrated as extending transversely in the vehicle 300 and is currently obscured by the instrument panel 200. In some implementations, the structure 306 can include the cross-vehicle beam 100 of FIG. 1. For example, the structure 306 can include the glove box 106 of FIG. 1.

Figure 4:
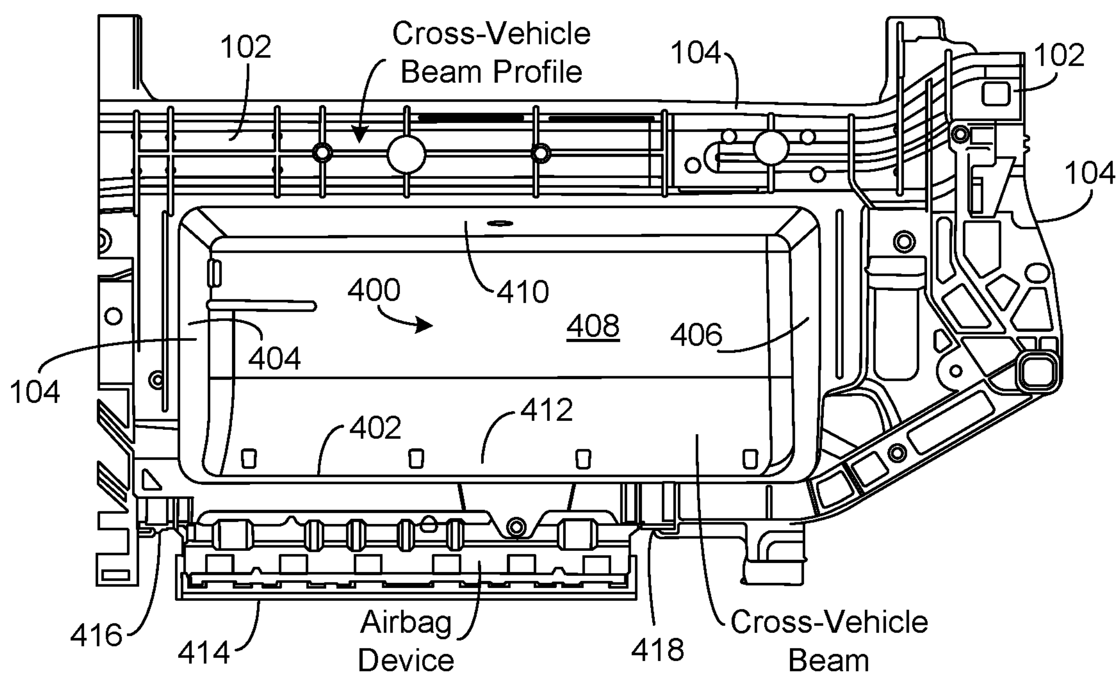
FIG. 4 shows an example of a glove box that can be formed by the plastic material of the cross-vehicle beam of FIG. 1.
Figure 5:
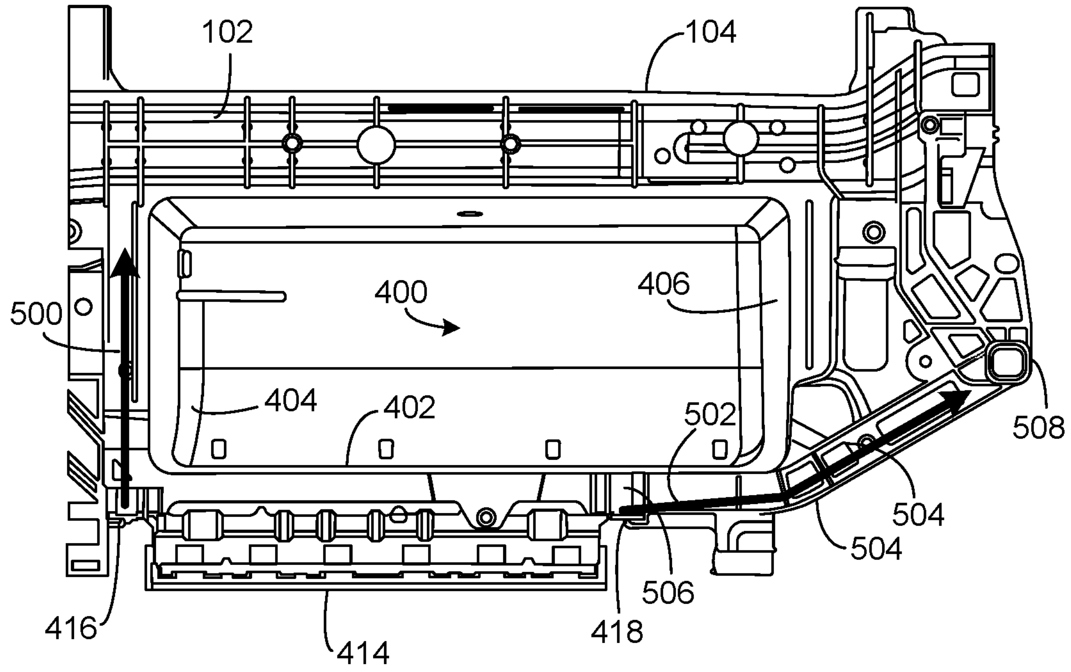
FIG. 5 shows an example of load paths and the glove box of FIG. 4.

FIG. 4 shows an example of a glove box 400 that can be formed by the plastic material 104 of the cross-vehicle beam 100 of FIG. 1. FIG. 5 shows an example of load paths 500 and 502 and the glove box 400 of FIG. 4. The glove box 400 and/or at least one of the load paths 500 and 502 can be used with one or more other examples described elsewhere herein. The glove box 400 is here shown as being part of the plastic material 104 that together with the metal profile 102 forms the cross-vehicle beam 100 of FIG. 1. The plastic material 104 and the metal profile 102 are here shown only in part for illustrative purposes. The load paths 500 and 502 are schematically shown as arrows.

Referring to FIG. 4, the glove box 400 has an opening 402 that allows access to one or more compartments formed by the glove box 400. The opening 402 can have any shape, including but not limited to a substantially rectangular shape (e.g., as shown). The glove box 400 has a side wall 404 and a side wall 406. The side walls 404-406 face substantially toward each other. In some implementations, each of the side walls 404-406 is substantially perpendicular to the longitudinal axis of the metal profile 102. The glove box 400 has a back wall 408 that extends between the side walls 404-406.

The glove box 400 has a transverse wall 410 that also extends between the side walls 404-406. In some implementations, the transverse wall 410 can be referred to as a top wall of the glove box 400. The transverse wall 410 is substantially perpendicular to the side walls 404-406 and connects them with each other. The transverse wall 410 here extends along (e.g., adjacent) a portion of the metal profile

102. That is, the transverse wall 410 can be substantially aligned with the longitudinal axis of the metal profile 102.

The glove box 400 has a transverse wall 412 that also extends between the side walls 404-406. In some implementations, the transverse wall 412 can be referred to as a bottom wall of the glove box 400. The transverse wall 412 is substantially perpendicular to the side walls 404-406 and connects them with each other. For example, the transverse wall 412 can be substantially aligned with the longitudinal axis of the metal profile 102.

An airbag device 414 is here mounted to the glove box 400. That is, the airbag device 414 is mounted to a portion of the plastic material 104 that forms the glove box 400. The airbag device 414 extends along the opening 402. For example, the airbag device 414 can be positioned in substantially the same orientation as the transverse wall 412. The airbag device 414 is mounted to the glove box 400 using a bracket portion 416 and a bracket portion 418. The bracket portions 416-418 can be part of the same bracket when the airbag device 414 is held by a single bracket, or the bracket portions 416-418 can be separate brackets. The bracket portion 416 can be positioned at one end of the airbag device 414 and the bracket portion 418 can be positioned at an opposite end of the airbag device 414. The airbag device 414 can be any of multiple types of airbag devices designed for use in a vehicle. In some implementations, the airbag device 414 is a knee airbag. In some implementations, the airbag device 414 is a passenger airbag.

Referring now also to FIG. 5, the design of the glove box 400 and/or other parts of the plastic material 104 can provide advantages in withstanding forces in the vehicle. The load path 500 can correspond to a component of the force that is generated when the airbag device 414 is deployed. In some implementations, the airbag device 414 is a knee airbag that deploys first downward and then almost immediately loops in an upward/rearward direction in the vehicle. The load path 500 can therefore represent part of the initial load on the glove box 400 (e.g., a reaction force load path) during deployment that is imparted through the bracket portion 416. In some implementations, the bracket portion 416 can be aligned with the side wall 404. Such a placement of the bracket portion 416 can seek to ensure that the load path 500 extends through the side wall 404 and thereby reaches the metal profile 102.

The load path 502 can correspond to another component of the force that is generated when the airbag device 414 is deployed. The bracket portion 418 is here positioned along the opening 402 between the side walls 404-406, such that the bracket portion 416 is positioned inboard of the bracket portion 418 in the vehicle. The load path 502 can therefore represent part of the initial load on the glove box 400 (e.g., a reaction force load path) during deployment that is imparted through the bracket portion 418. The plastic material 104 can define a load structure 504. The load path 502 can extend through the load structure 504. The load structure 504 can have an end 506 connected to the bracket portion 418, and an end 508 to be connected to the vehicle body. The load structure 504 can extend from the end 506 along the opening 402 to the side wall 406, and from the side wall 406 to the end 508 outside the side wall 406 from the glove box 400.

Figure 6:
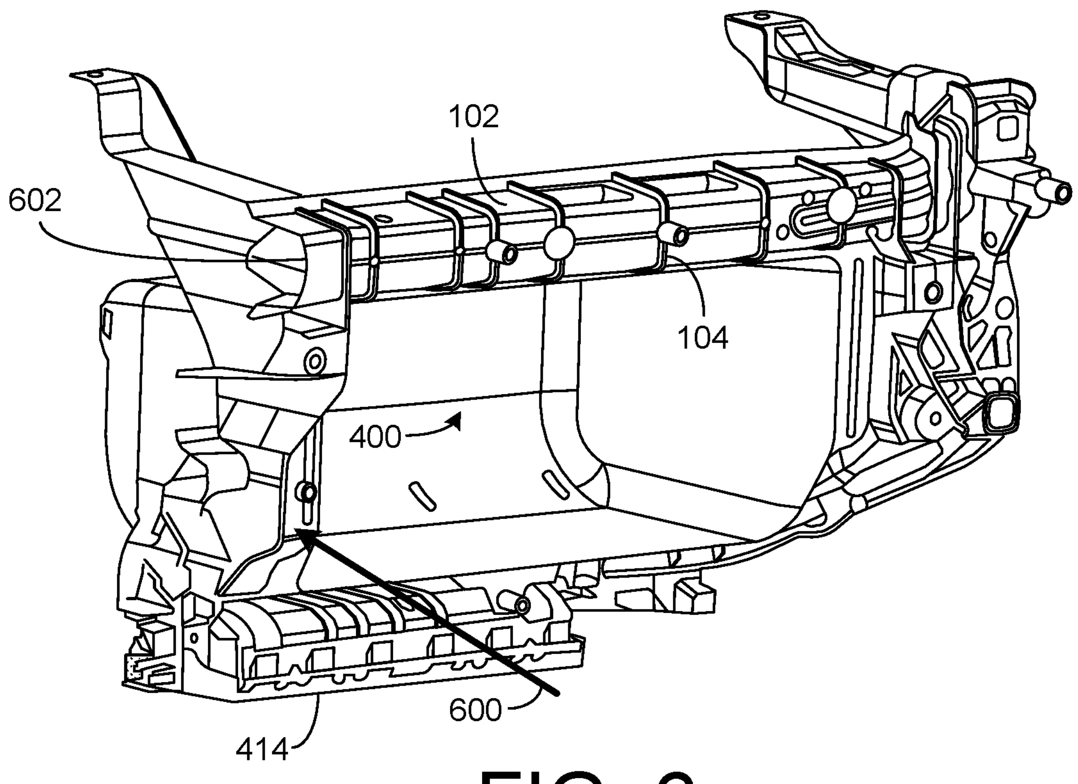
FIG. 6 shows another example of a load path and the glove box of FIG. 4.
Figure 7:
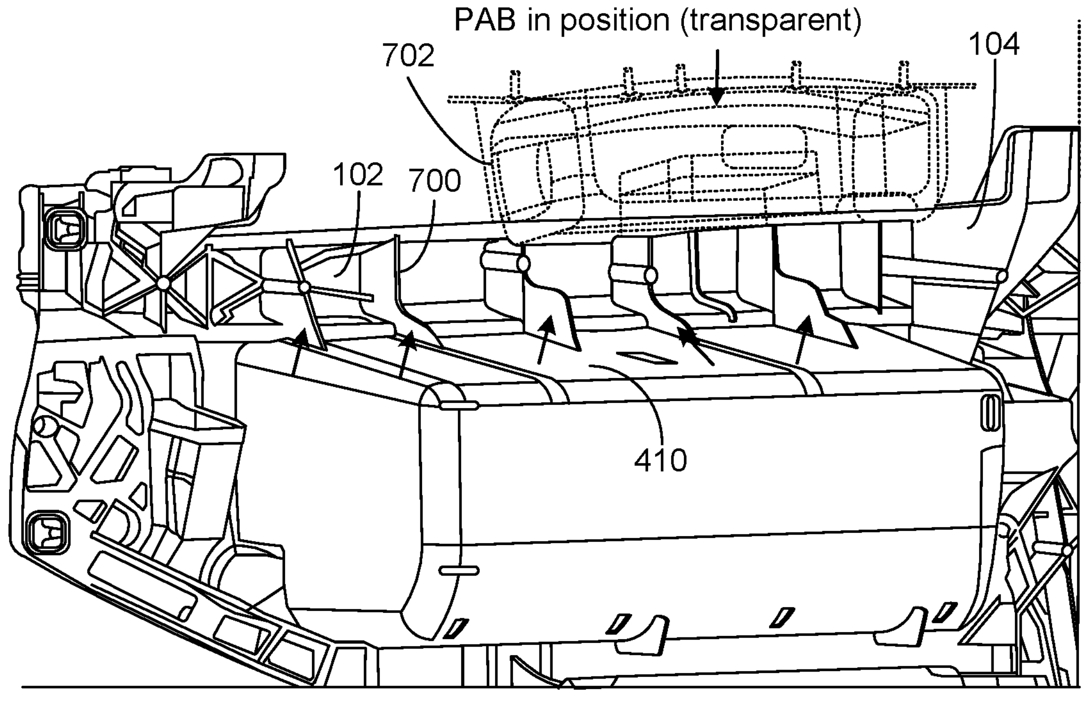
FIG. 7 shows an example of the plastic material of the cross-vehicle beam of FIG. 1 forming ribs at the glove box of FIG. 4.

FIG. 6 shows another example of a load path 600 and the glove box 400 of FIG. 4. FIG. 7 shows an example of the plastic material of the cross-vehicle beam of FIG. 1 forming ribs 700 at the glove box 400 of FIG. 4. FIG. 7 shows the glove box 400 from the opposite direction compared to FIG. 6. The load path 600 and/or the ribs 700 can be used with one or more other examples described elsewhere herein. The load path 600 is schematically shown as an arrow.

In FIG. 6, the truncated view shows that the metal profile 102 has an open profile 602. The metal profile 102 can have the open profile 602 along an entirety of the longitudinal axis. For example, the open profile 602 can be open toward a front of the vehicle. In some implementations, the open profile 602 can be a C-profile. The plastic material 104 can be overmolded on the metal profile 102 (e.g., by injection molding). In some implementations, the metal profile 102 is provided with holes; the plastic material 104 can cover part of an outside surface and part of an inside surface of the metal profile 102, as well as extend through the holes to join the outside and inside parts with each other.

The load path 600 can represent an occupant crash load path, meaning the path of a force imparted by the occupant's body in the event of a crash. The load path 600 is here substantially in an x-direction of a vehicle coordinate system, meaning a direction from vehicle-rearward to vehicle-forward. This example illustrates that the plastic material 104 of the cross-vehicle beam, including the glove box 400 can accommodate the load path 600 as well as the load paths 500-502. In FIG. 7, the rib 700 defines a plane that is substantially perpendicular to the longitudinal axis of the metal profile 102. The plastic material 104 can include multiple instances of the rib 700, each connecting the metal profile 102 and the transverse wall 410 to each other. When the metal profile 102 has the open profile 602 of FIG. 6, the rib 700 can extend into the open profile 602. The load path 600 extends substantially in the plane of the rib 700. For example, the rib 700 can convey torque generated by the load of the load path 600 into the metal profile 102.

An airbag device 702 can be mounted to the plastic material 104. The airbag device 702 can be positioned on an opposite side of the metal profile 102 from the glove box 400 and the airbag device 414. For example, the airbag device 414 can be positioned below, and the airbag device 702 can be positioned above, the metal profile 102. In some implementations, the airbag device 702 is a passenger airbag. The airbag device 702 can deploy substantially in an upward direction, meaning that reaction loads from the airbag device 702 are directed downward in this example. The ribs 700 allow the glove box 400, which is integrated into the plastic material 104 of the cross-vehicle beam, to support airbag loads from the airbag device 702. The ribs 700 can also aid in resisting displacement of the airbag device 702 from deployment.

Figure 8:
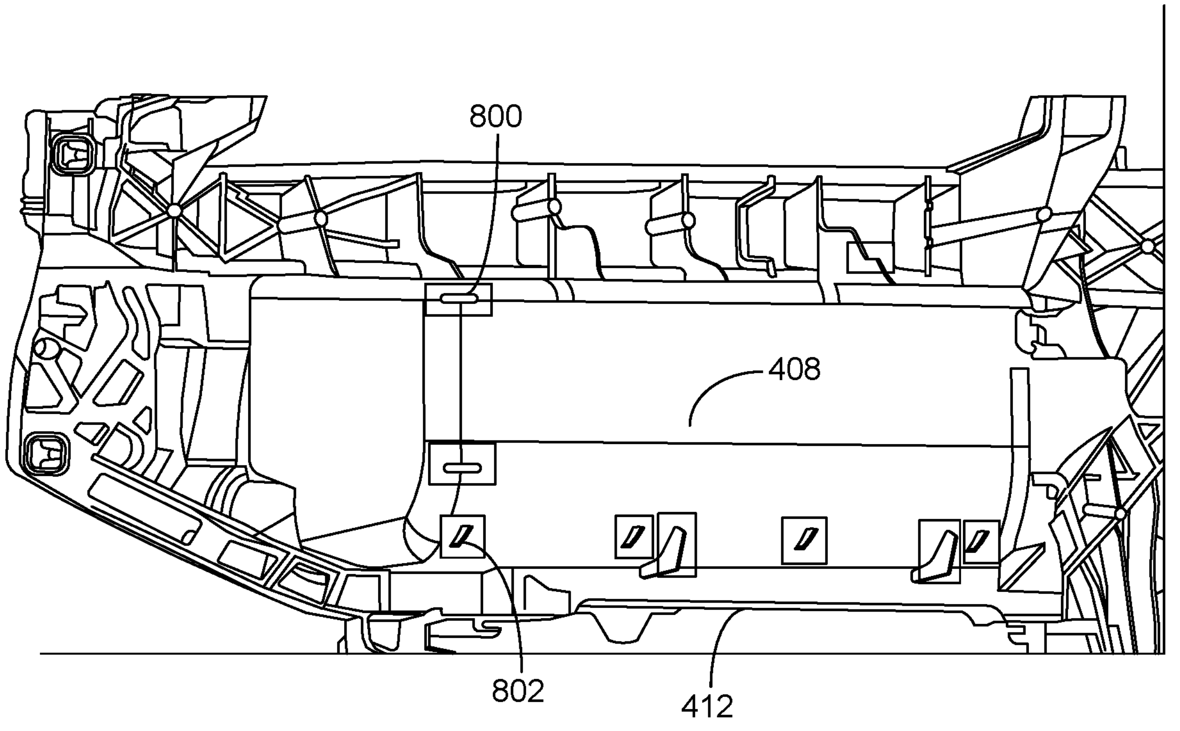
FIG. 8 shows an example of the glove box of FIG. 4 forming mounting points and locating holes.

FIG. 8 shows an example of the glove box 400 of FIG. 4 forming mounting points 800 and locating holes 802. The mounting points 800 and/or the locating holes 802 can be used with one or more other examples described elsewhere herein. FIG. 8 shows the glove box 400 from the opposite direction compared to FIG. 6.

One or more of the mounting points 800 can be positioned anywhere on the glove box 400. Here, multiple instances of the mounting points 800 are located on an exterior surface of the back wall 408. The mounting points 800 can be used for mounting an instrument panel part. For example, a harness of cables for the instrument panel can be mounted to the cross-vehicle beam using one or more of the mounting points 800. Providing the mounting points 800 on the glove box 400 can give more options for attaching the harness, meaning that the harness path can be made shorter and the cost of the harness can be lower.

One or more of the locating holes 802 can be positioned anywhere on the glove box 400. Here, multiple instances of the locating holes 802 extend through the back wall 408 near the transverse wall 412. The locating holes 802 can be used for positioning a component of the glove box 400. For example, a mat or other trim can be located using one or more of the locating holes 802. Providing the locating holes 802 on the glove box 400 which is integrated into the cross-vehicle beam eliminates the need to provide corresponding holes on a separate glove box component that would otherwise be a part of the instrument panel.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A vehicle comprising:

a vehicle body including a passenger compartment;

a cross-vehicle beam extending in a transverse direction inside the passenger compartment, the cross-vehicle beam including a metal profile and plastic material, wherein the plastic material forms a glove box, the glove box having an opening and first and second side walls that are substantially perpendicular to a longitudinal axis of the metal profile; and a first airbag device extending along the opening and mounted to the glove box using a first bracket portion at a first end of the first airbag device and using a second bracket portion at a second end of the first airbag device opposite from the first end, wherein a first reaction force load path from deployment of the first airbag device extends through the first side wall into the metal profile.

2. The vehicle of claim 1, wherein the first bracket portion is aligned with the first side wall, and wherein the second bracket portion is positioned along the opening between the first and second side walls.

3. The vehicle of claim 2, wherein the first bracket portion is positioned inboard of the second bracket portion in the vehicle.

4. The vehicle of claim 1, wherein the plastic material further comprises a load structure, and wherein a second reaction force load path from deployment of the first airbag device extends through the load structure.

5. The vehicle of claim 4, wherein a first end of the load structure is connected to the second bracket portion, and wherein a second end of the load structure is connected to the vehicle body.

6. The vehicle of claim 5, wherein the load structure extends from the first end of the load structure along the opening to the second side wall, and from the second side wall to the second end of the load structure outside the second side wall from the glove box.

7. The vehicle of claim 1, wherein the metal profile has an open profile along an entirety of the longitudinal axis, and wherein the plastic material is overmolded onto the metal profile.

8. The vehicle of claim 7, wherein the open profile is a C-profile.

9. The vehicle of claim 1, wherein the glove box defines a transverse wall that is substantially perpendicular to, and connects to each other, the first and second side walls, and wherein the glove box is positioned adjacent the metal profile with the transverse wall substantially aligned with the longitudinal axis.

10. The vehicle of claim 9, wherein the plastic material further comprises a rib defining a plane that is substantially perpendicular to the longitudinal axis, the rib connecting the metal profile and the transverse wall to each other.

11. The vehicle of claim 10, wherein the metal profile has a C-profile along an entirety of the longitudinal axis, and wherein the rib extends into the C-profile.

12. The vehicle of claim 10, wherein the rib is configured so that an occupant crash load path extends substantially in the plane of the rib.

13. The vehicle of claim 1, wherein the first airbag device is a knee airbag device.

14. The vehicle of claim 1, further comprising a second airbag device mounted to the plastic material on an opposite side of the metal profile from the glove box and the first airbag device.

15. The vehicle of claim 1, wherein the glove box defines a back wall opposite the opening, and wherein the glove box further comprises a mounting point for an instrument panel part, the mounting point positioned on an exterior surface of the back wall.

16. The vehicle of claim 1, wherein the glove box further comprises a locating hole.

* * * * *